(No Model.)

W. HILLMAN.
CARRIAGE OR WAGON JACK.

No. 288,057. Patented Nov. 6, 1883.

UNITED STATES PATENT OFFICE.

WILLIAM HILLMAN, OF HAYNESVILLE, MAINE.

CARRIAGE OR WAGON JACK.

SPECIFICATION forming part of Letters Patent No. 288,057, dated November 6, 1883.

Application filed June 5, 1883. (No model.)

*To all whom it may concern:*

Be it known that I, WILLIAM HILLMAN, of Haynesville, in the county of Aroostook and State of Maine, have invented certain new and useful Improvements in Carriage or Wagon Jacks; and I do hereby declare that the following is a full, clear, and exact description the invention, that will enable others skilled in the art to which it appertains to make and use the same, reference being had to the accompanying drawings, forming a part of this specification, in which—

Figure 1:
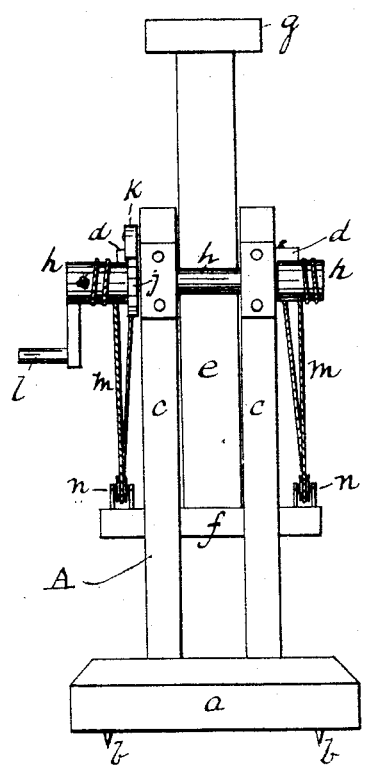
Figure 2:
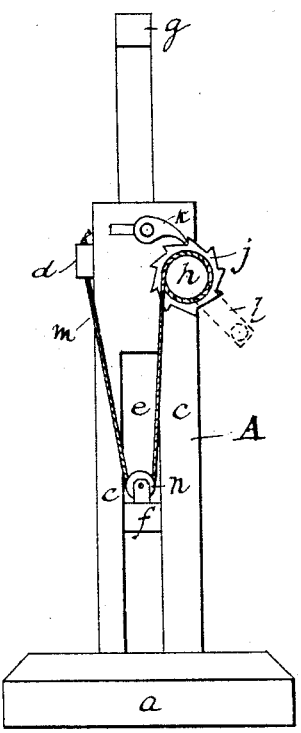

Figure 1 shows a front elevation; Fig. 2, a side elevation.

Same letters show like parts.

My invention consists of an improved carriage-jack, and will be best understood by reference to the annexed drawings, in which—

A shows a suitable frame constructed with the base $a$, having studs $b$ therein, if desired, standards $c$, and cross-bar $d$. Between these standards is the post $e$, provided with the cross-bars $f$ and $g$, all capable of sliding vertically between the standards.

Upon the frame A, at $h$, is journaled a shaft having the ratchet $j$ thereon, engaging with the pawl K, attached to the frame A, and provided with the crank $l$. At each end of this shaft are secured cords or chains $m$, passing down through pulleys $n$ on the cross-bar $f$, and thence up to the cross-bar $d$, where they are secured.

The jack having been placed in position under the axle of the vehicle, the crank $l$ is turned, winding the cords $m$ upon the shaft, and elevating the post $e$ upon the cross-bar $g$ of which the axle rests, to the extent desired, the ratchet and pawl retaining it in position.

What I claim as my invention is—

In a carriage-jack, the combination of the frame A, vertically-movable post, $e$, cross-bars $d$ and $f$, shaft $h$, ratchet and pawl $j$ $k$, and cords and pulleys $m$ $n$, all arranged and operating substantially in the manner and for the purposes herein set forth.

In testimony that I claim the foregoing I have hereunto set my hand this 25th day of May, 1883.

WILLIAM HILLMAN.

Witnesses:
NOAH HILLMAN,
J. D. CLIFFORD, Jr.